R. H. ANDERSON.
FIBER CEMENT COMPOSITION AND METHOD AND APPARATUS FOR FORMING SAME.
APPLICATION FILED DEC. 18, 1919.

1,408,241. Patented Feb. 28, 1922.

Robert H. Anderson Inventor
By his Attorney
Edwards, Sager & Bower

UNITED STATES PATENT OFFICE.

ROBERT H. ANDERSON, OF AMBLER, PENNSYLVANIA, ASSIGNOR TO ASBESTOS SHINGLE, SLATE & SHEATHING COMPANY, A CORPORATION OF PENNSYLVANIA.

FIBER-CEMENT COMPOSITION AND METHOD AND APPARATUS FOR FORMING SAME.

1,408,241.     Specification of Letters Patent.     Patented Feb. 28, 1922.

Application filed December 18, 1919. Serial No. 345,725.

*To all whom it may concern:*

Be it known that I, ROBERT H. ANDERSON, a citizen of the United States, residing at Ambler, in the county of Montgomery and State of Pennsylvania, have invented certain new and useful Improvements in Fiber-Cement Compositions and Methods and Apparatus for Forming Same, of which the following is a specification.

This invention relates to cement and fiber compositions such as used in roofing, shingles, builders' boards, artificial slate, etc., and particularly to coloring the same. Such material has a natural grey color which is difficult to overcome without using large quantities of expensive coloring matter, the presence of which in the material has also proven objectionable in weakening the latter. It is therefore highly desirable to confine the coloring to the surface of the final product so as to both avoid weakening it and save the cost of the coloring matter hitherto diffused throughout the interior of the mass. A surface coloring has been successfuly applied to the composition during its formation but, often, and particularly with some of the lighter shades, there is a tendency for the natural cement color to unfavorably affect the coloring in the final product. Greens and reds for instance are lightened and changed in their color composition.

The object of this invention is to provide a product in which the coloring, while confined to the surface, will not be unfavorably affected by the body of the composition, but will have the true color value desired.

In the accompanying drawing illustrating this invention—

Figure 1:
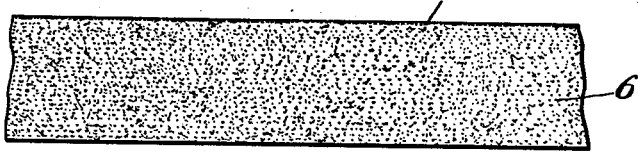
Fig. 1 is a sectional view of one embodiment of the product of this invention.

In the embodiment of the invention illustrated in Fig. 1 a portion of the asbestos cement composition product is shown having a colored surface 5 merging into and integral with the body of the composition 6. The colored surface is preferably applied to the composition when the latter is wet so as to form a unitary integral mass but there results from this a tendency for the body of the composition to absorb some of the coloring matter and to itself permeate into view through the surface film. The natural grey cement color, therefore, often undesirably affects the final coloring giving it a weakened unnatural hue. To avoid this objectionable change of color the product of this invention has the composition 6, or particularly that part of it adjacent the colored surface 5, darkened or tinted to combine with the coloring 5. For instance to avoid weakening a red or green color in the surface 5, the composition 6 will be darkened as with manganese oxide, carbon black or graphite, with the result that the deep red of the iron will not be be weakened by the composition beneath.

Figure 2:
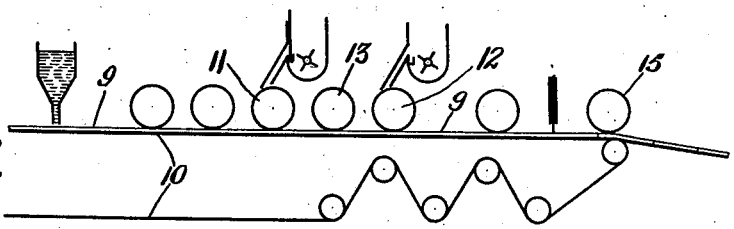
Fig. 2 is a diagram illustrating a process of this invention.

This auxiliary darkening or coloring may be diffused through the composition 6 or confined, to the parts adjacent the surface 5. For instance as illustrated in Fig. 2 the body of the composition 9 on belt 10 may be colored throughout in mixing or may have the auxiliary coloring or shading applied to its surface as by roll 11 in advance of the application of the surface coloring by roll 12, and a roller 13 or other working may intervene between rolls 11 and 12, the material being further worked as by roller 15 and then cut and pressed and allowed to set. The coloring matter from roller 12 preferably contains fiber material and cement of the same character as that in the composition, or is thoroughly worked into the fiber cement composition 6, so that the composition and all the coloring matters integrally merge and set together the coloring permeating in and being held by the cement fiber composition.

Figure 3:
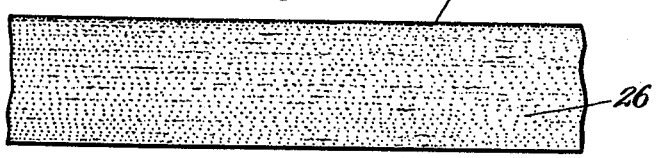
Fig. 3 is a sectional view of another product of this invention.
Figure 4:
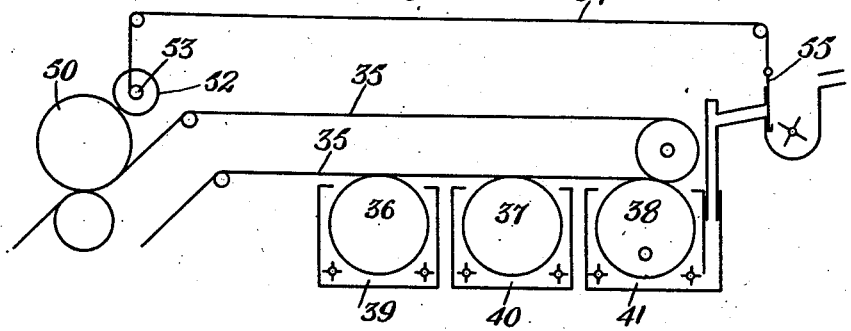
Fig. 4 is a diagram illustrating a modified process.

This auxiliary or indirect shading or tinting requires little coloring matter and saves in the amount of the main color used and it also permits combinations of coloring ingredients which will not mix well directly and the range of colors is increased. At the same time the proper formation of the main composition is not interfered with as the amount of auxiliary coloring is very small and inexpensive, and the bond between the surface and the body of the composition remains unweakened.

Where as in Fig. 3 the product is built up in layer formation the surface 25 of the layer composition 26 will be impregnated by the color and an auxiliary color or shading will be mixed with one or more layers of the composition 26 or applied as an undersurfacing just beneath the main coloring. For instance as illustrated in Fig. 4 belt 35 may receive deposits of the composition from rollers 36, 37 and 38 in vats, 39, 40 and 41 respectively. The composition in vat 41 will be colored as by red oxide of iron and will be intermittently applied so as to be confined to the surface of the product. The composition in vats 39 and 40, or of vat 40 alone, may be darkened as by lamp black, manganese oxide or graphite. Then the colored film from vat 41 will be deposited on the darkened composition from vats 39 and 40. The feed from vat 40 may be made intermittent as is that from vat 41 where supply gate 55 is moved by winding of string 54 on axle 53 of roll 52 as material on cylinder 50 builds up to a certain thickness. When this thickness is reached the material is removed from cylinder 50 and then the fresh material collected thereon will have its surface colored from vat 41. Removal of the material from cylinder 50 permits the gate 55 to close so that only a small increment of coloring matter flows into vat 41 and this is quickly exhausted and the color confined to these surfaces which are the finished surfaces of the final product. Where vat 40 is also provided with an intermittent feed its coloring will only appear underlying the coloring from vat 41.

In the product of this invention colors may be combined which cannot be directly mixed. For instance it has been found difficult to darken some natural shades of green by mixing the green coloring matter with a darkening matter such as lamp black, graphite or manganese oxide. In such case with a green coloring at roll 12 or vat 41, and the darkening material on roll 11 or in vat 40, the desired combination can be easily allowed and the final pure color be developed and may also be confined to the surface of the product, though in some cases it may be advantageous to mix the auxiliary coloring or shading matter with the entire body of the asbestos cement composition.

I claim:

1. A product comprising a body of hydraulic cement and fiber having coloring matter incorporated in it, and a surface layer comprising a different coloring matter pressed together with said body and integrally set therewith, said coloring matters cooperating to give the final surface color to the product.

2. A product comprising a body of hydraulic cement and fiber having coloring matter incorporated in it adjacent its surface, and a surface layer comprising a different coloring matter pressed together with said body and integrally set therewith, said coloring matters cooperating to give the final surface color to the product.

3. A product comprising a mass of worked up hydraulic cement, water, fibrous material and coloring matter and a surface impregnation of lighter color, the whole being subjected to pressure and the cement set.

4. A product comprising a mass of worked up hydraulic cement, water, fibrous material and coloring matter and a surface film of similar material colored with a lighter color, the whole being subjected to pressure and the cement set.

5. A product comprising a mass of worked up hydraulic cement, water, fibrous material and coloring matter of blackish color and a surface film of similar material colored with a reddish color impregnation of lighter color, the whole being subjected to pressure and the cement set.

6. A product comprising a mass of worked up hydraulic cement, water, fibrous material and coloring matter with manganese oxide and a surface film of similar material colored with red oxide of iron, impregnation of lighter color, the whole being subjected to pressure and the cement set.

7. A product comprising a plurality of layers of colored hydraulic cement, water and fibrous material, and an outside layer of similar material colored with a lighter color, the several layers being pressed together and the cement set.

8. The process of making hydraulic cement and fiber products comprising working up hydraulic cement, fibrous material, water and coloring matter to produce a wet composition having a certain coloring, impregnating the surface of said composition with a second coloring confined to the surface of said composition and cooperating in desired manner with said prior coloring, subjecting the whole to pressure to form it into an integral mass, and permitting it to set to integrally bind said colorings in the body of the set composition.

9. The process of making hydraulic cement and fiber products comprising working up hydraulic cement, fibrous material, water and coloring matter to produce a wet composition having a certain coloring, flowing a second coloring on the surface of said composition, working the second coloring into an integral mass with said composition, and permitting the whole to set to integrally bind said colorings in the body of the set composition.

10. The process of coloring hydraulic cement and fiber products comprising coloring the composition with one color, and subsequently and while the composition is wet depositing on the surface a different coloring cooperating with the first coloring in desired manner, subjecting the whole to pressure to form it into an integral mass, and permitting it to set to integrally bind the colors in the product.

11. The process which consists in working hydraulic cement, water, fibrous material and a dark coloring matter, to form a plurality of layers, applying thereto an outside layer of similar material colored with a lighter coloring matter, and then pressing the several layers together and allowing them to set.

12. The process which consists in rolling up a continuous web comprising a mixture of hydraulic cement, water, fibrous material and coloring matter upon a roll to from a plurality of superimposed layers and intermittently imparting to said web a film of similar material colored with a lighter coloring matter, and then subjecting the superimposed layers to pressure and allowing the mass to set.

13. In apparatus for making hydraulic cement and fiber products the combination with means for working hydraulic cement, fiber, water and coloring matter into a composition of a certain surface color, of means for applying a second color to the surface of said composition and working said second color with said composition to form an integral mass so that the final set product will integrally contain the said colors.

14. In apparatus for making hydraulic cement and fiber products the combination with means for working hydraulic cement, fiber, water and coloring matter into a continuous composition on a belt surface, of a subsequent roller adapted to apply to the surface of said composition a different coloring matter, and means for working said colors with said composition to form an integral mass which upon setting will solidly bind said colors in the surface of the final product.

15. The combination of means for mixing hydraulic cement, water, fibrous material and coloring matter, means for forming the same in sheet form, means for applying thereto a surface layer of similar material colored with a lighter coloring matter and means for applying pressure to the mass before the cement sets.

16. The combination of means for mixing hydraulic cement, water, fibrous material and coloring matter, means for building up a plurality of layers thereof, means for intermittently applying a layer of similar material colored with a lighter coloring matter, and means for pressing the several layers together before the cement sets.

ROBERT H. ANDERSON.